(12) United States Patent
Huang

(10) Patent No.: US 9,449,742 B2
(45) Date of Patent: Sep. 20, 2016

(54) ELECTRODE COMPONENT AND METHOD FOR FABRICATING THE SAME

(71) Applicant: THINKING ELECTRONIC INDUSTRIAL CO., LTD., Kaohsiung (TW)

(72) Inventor: Jen-Heng Huang, Kaohsiung (TW)

(73) Assignee: THINKING ELECTRONIC INDUSTRIAL CO., LTD., Kaohsiung (TW)

(*) Notice: Subject to any disclaimer, the term of this patent is extended or adjusted under 35 U.S.C. 154(b) by 62 days.

(21) Appl. No.: 14/634,823

(22) Filed: Feb. 28, 2015

(65) Prior Publication Data

US 2016/0086699 A1    Mar. 24, 2016

(30) Foreign Application Priority Data

Sep. 18, 2014 (CN) .......................... 2014 1 0479427

(51) Int. Cl.
| | |
|---|---|
| *H01C 1/142* | (2006.01) |
| *H01C 7/102* | (2006.01) |
| *H01C 17/28* | (2006.01) |
| *H01B 1/02* | (2006.01) |
| *H01G 4/232* | (2006.01) |
| *H01G 4/252* | (2006.01) |
| *H01C 7/12* | (2006.01) |
| *H01C 17/06* | (2006.01) |

(Continued)

(52) U.S. Cl.
CPC ............... *H01C 1/142* (2013.01); *H01B 1/02* (2013.01); *H01C 7/102* (2013.01); *H01C 7/12* (2013.01); *H01C 17/06* (2013.01); *H01C 17/281* (2013.01); *H01C 17/283* (2013.01); *H01G 4/232* (2013.01); *H01G 4/252* (2013.01); *H01C 1/014* (2013.01); *H01C 1/144* (2013.01)

(58) Field of Classification Search
CPC ..................................................... H01C 1/142
See application file for complete search history.

(56) References Cited

U.S. PATENT DOCUMENTS

| 2,418,460 A | * | 4/1947 | Ernest | ................... | H01C 1/142 |
| | | | | | 228/122.1 |
| 2,418,461 A | * | 4/1947 | Becker | .................. | H01C 1/142 |
| | | | | | 228/122.1 |
| 2,679,568 A | * | 5/1954 | Smith | ................... | H01C 1/142 |
| | | | | | 252/513 |

(Continued)

FOREIGN PATENT DOCUMENTS

| CN | 103247362 A | 8/2013 |
| TW | I370463 B | 8/2012 |

*Primary Examiner* — James Harvey
(74) *Attorney, Agent, or Firm* — Pai Patent & Trademark Law Firm; Chao-Chiang David Pai

(57) ABSTRACT

An electrode component includes a ceramic substrate, two electrode layers formed on two opposite surfaces of the ceramic substrate, two pins respectively connected to the two electrode layers, and an insulating layer enclosing the ceramic substrate, the electrode layers and a portion of each pin. Each electrode layer is formed of two or more base metal materials or alloys thereof, and the concentrations of the base metal materials progressively vary across the electrode layer. Accordingly, the production cost is lowered, environmental pollution caused by evaporation and thermal dissolution of organic solvent can be prevented, risk of separable electrode interface at high-voltage discharge is mitigated, and the fabrication process of the electrode layer is shortened while maintaining bonding strength between the electrode layers and the ceramic substrate and solderability between the electrode layers and the pins.

18 Claims, 5 Drawing Sheets

(51) Int. Cl.
*H01C 1/014* (2006.01)
*H01C 1/144* (2006.01)

(56) References Cited

U.S. PATENT DOCUMENTS

| | | | | |
|---|---|---|---|---|
| 2,786,925 A | * | 3/1957 | Kahan | H01B 1/00 |
| | | | | 174/84 R |
| 3,691,656 A | * | 9/1972 | Mochizuki | H01C 1/142 |
| | | | | 174/94 R |
| 4,409,135 A | * | 10/1983 | Akimune | C04B 41/5177 |
| | | | | 106/1.15 |
| 4,737,757 A | * | 4/1988 | Senda | H01C 7/006 |
| | | | | 338/308 |
| 7,098,163 B2 | | 8/2006 | Hampden-Smith et al. | |
| 2016/0035466 A1 | * | 2/2016 | Xu | H01C 1/14 |
| | | | | 338/20 |
| 2016/0086699 A1 | * | 3/2016 | Huang | H01C 1/142 |
| | | | | 338/21 |

* cited by examiner

ELECTRODE COMPONENT AND METHOD FOR FABRICATING THE SAME

BACKGROUND OF THE INVENTION

1. Field of the Invention

The present invention relates to an electrode of an electrode component, and more particularly, to an electrode component with an electrode layer formed of two or more different metal materials and a method for fabricating the same.

2. Description of the Related Art

A varistor is an electronic component mainly formed by zinc oxide powder and mixed with bismuth oxide, antimony oxide, manganese oxide and the like diffused to grain boundaries of zinc oxide. After the mixture is molded by a dry press process, organic binder is removed from the mixture and a ceramic resistor with nonlinear characteristics is generated from the molded mixture using a high-temperature sintering process.

The conductive electrode layer of a conventional varistor is usually formed by the silk-screen printing technique. During fabrication of the electrode layer, a ceramic chip with organic silver paste having a weight percent range of silver 60~80% attached thereto is processed using an imbibition process in a temperature range of 600~900° C. for the organic silver paste to form a desired electrode layer. The thickness of the electrode layer is normally maintained in a range of 6~15 μm for soldering and product reliability. However, conventional silk-screen printing process has the following drawbacks and deficiencies.

1. Lots of toxic substances contained in the organic silver paste cause serious environmental pollution.

2. High production cost arises from the use of a great deal of precious silver material. To increase the surge-withstanding capability of the varistor, thick silver layer is inevitably adopted, and the thickness of the silver layer is oftentimes more than 15 μm.

The varistor with silver electrode fabricated using the conventional silk-screen printing process has the following shortcomings.

1. Low bonding strength due to the silver-ceramic incompatibility. The bonding strength is increased mainly through the glassy substance in the organic silver paste diffused to the grain boundaries of ceramic, such that the bonding strength between the silver electrode layer and the ceramic substrate is not satisfactory.

2. High-resistance ohmic contact.

3. Poor corrosion resistance of the silver electrode layer against lead-free solder. As the solid solubility of silver and tin is relatively high, solder can easily etch a silver layer at a high temperature. Nowadays, owing to the concern of environmental protection, products are manufactured using the lead-free soldering technique. To avoid pseudo soldering and melting silver, the 3Ag solder indicative of a Sn—Ag—Cu solder alloy with a higher silver content at a weight percentage of silver 3% is used for soldering and thus becomes a cost-down barrier of products. Meanwhile, because of the high mutual solubility of tin and silver in a lead-free solder, after products are powered on and operated for a long time, the silver electrode layer can be easily etched by the solder, such that the electrode has a reduced adhesion force and even becomes detached. Therefore, once the electrode becomes detached, transportation equipment, such as vehicles, using such type of varistor could be in a dangerous situation.

To lower production cost of the varistors, as disclosed in China Patent Application No. 201310177249.5, entitled "Base metal combination electrode of electronic ceramic element and preparation method therefor", the drawback of the electrode of the varistor fabricated using a technique of hot-spraying multiple layers of base metal resides in that upon a high-voltage discharge current gives rise to high heat at metal electrode interfaces and the metal electrode interfaces could be easily separable, hindering durability and reliability of products.

SUMMARY OF THE INVENTION

An objective of the present invention is to provide an electrode component and a method for fabricating the same allowing electrode layers of the electrode component to be formed of two or more metal materials sequentially stacked and the electrode layers and a ceramic substrate to be tightly bonded with good solderability.

To achieve the foregoing objective, the electrode component has a ceramic substrate, two electrode layers, two pins and an insulating layer.

The ceramic substrate has two opposite surfaces.

The two electrode layers are respectively formed on the two opposite surfaces of the ceramic substrate.

Each pin has a top portion connected to a respective one of the two electrode layers.

The insulating layer encloses the ceramic substrate, the two electrode layers and the top portion of each pin.

Each electrode layer is formed of two or more base metal materials or alloys of the base metal materials with a concentration gradient of each of the base metal materials progressively varying across the electrode layer.

Preferably, each electrode layer is formed by two or more of zinc, copper, tin, nickel and aluminum or alloys of two or more of zinc, copper, tin, nickel and aluminum, and has a thickness in a range of 20 to 100 μm.

Preferably, each electrode layer is formed on a corresponding surface of the ceramic substrate sequentially through an initial stage, an intermediate stage and a final stage, and a portion of the electrode layer formed during the initial stage is formed of a first metal material or an alloy of the first metal material, a portion of the electrode layer formed during the final stage is formed of a second metal material or an alloy of the second metal material, a portion of the electrode layer formed during the intermediate stage is formed of the first metal material and the second metal material or an alloy of the first metal material and the second metal material, a concentration of the portions formed from the initial stage to the intermediate stage progressively decreases from 100% to 0%, and a concentration of the portions formed since the intermediate stage progressively increases from 0% to 100%.

To achieve the foregoing objective, the method for fabricating the foregoing electrode component has steps of:

preparing the ceramic substrate pre-treated and having two opposite surfaces;

forming each electrode layer on one of the two opposite surfaces of the ceramic substrate by a spray forming process; the spray forming process has steps of spraying a first metal material to a corresponding surface of the ceramic substrate, and spraying a second metal material to the corresponding surface of the ceramic substrate when a first period of time expires after the first metal material begins to be sprayed; and stopping spraying the first metal material and stopping spraying the second metal material when a second period of time expires after stopping spraying the first metal material to form the electrode layer on the corresponding surface of the ceramic substrate;

connecting the two pins respectively to the electrode layers on the two opposite surfaces of the ceramic substrate; and enclosing the ceramic substrate, the electrode layers and a portion of each pin with an insulating layer.

Under the premise of original electrical characteristics of products, the benefits of the present invention includes lower production cost, no environment pollution arising from evaporation and thermal dissolution of organic solvent used in silk-screen printed conventional silver electrode, and reduced risk of separable electrode interface at high-voltage discharge because of bonding strength issue between different metal materials. Accordingly, the fabrication process of electrode layer is shortened while maintaining bonding strength between the electrode and the ceramic substrate and the solderability of the metal pins.

Other objectives, advantages and novel features of the invention will become more apparent from the following detailed description when taken in conjunction with the accompanying drawings.

DETAILED DESCRIPTION OF THE INVENTION

Figure 1A:
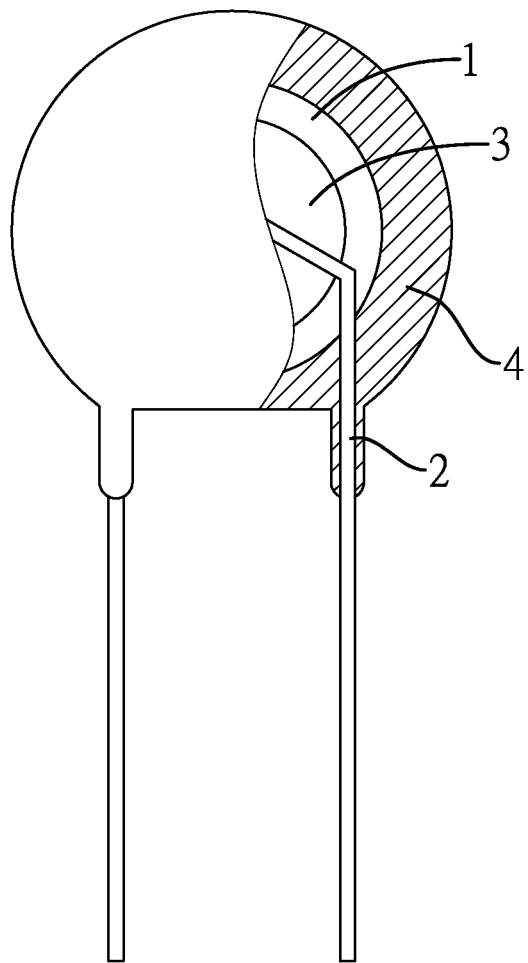
FIG. 1A is a partially cross-sectional schematic view of an electrode component in accordance with the present invention.
Figure 1B:
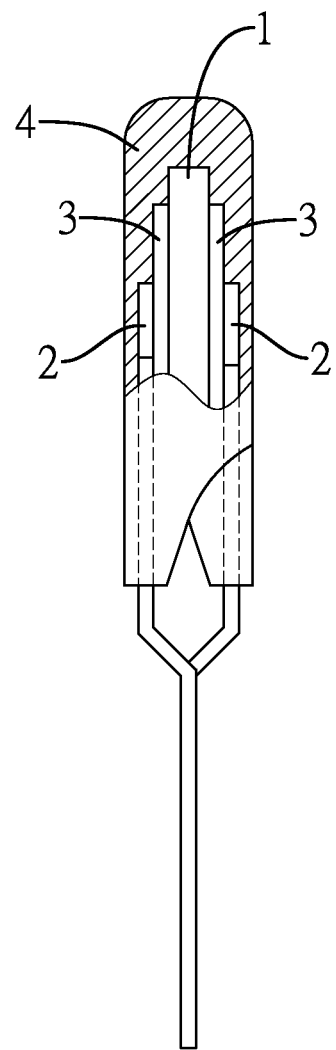
FIG. 1B is another partially cross-sectional schematic view of the electrode component in FIG. 1A.

With reference to FIGS. 1A and 1B, an electrode component in accordance with the present invention includes a ceramic substrate 1, two electrode layers 3, two pins 2 and an insulating layer 4.

The two electrode layers 3 are respectively formed on two opposite surfaces of the ceramic substrate 1. The two pins 2 are respectively connected to the electrode layers 3. The insulating layer 4 encloses the ceramic substrate 1, the electrode layers 3 and a portion of each pin 2.

Figure 2:
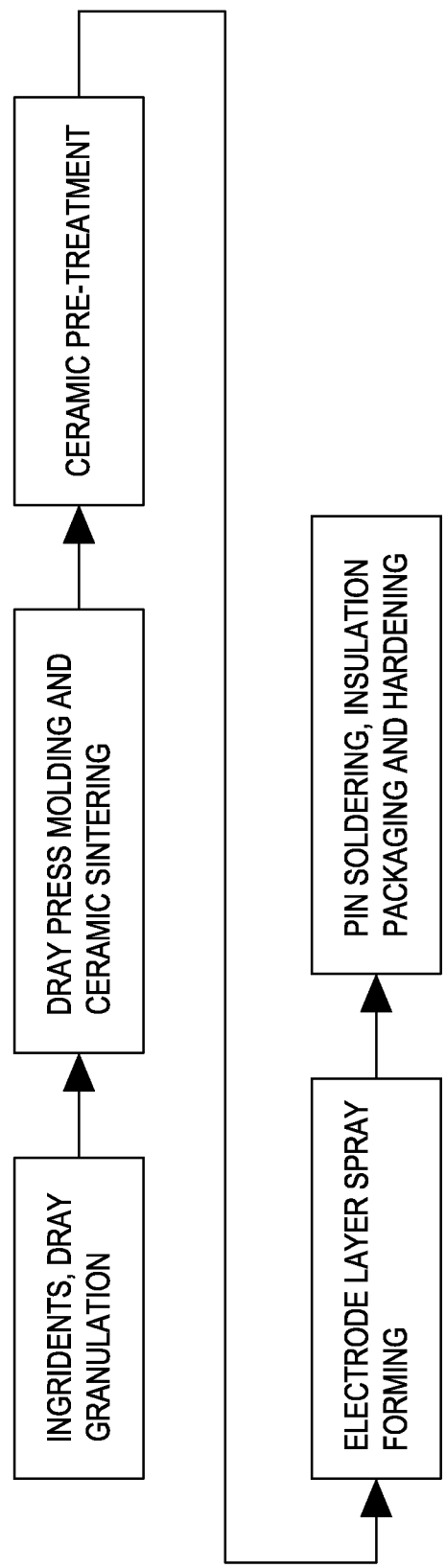
FIG. 2 is a flow diagram of a method for fabricating the electrode component in FIG. 1A.

With reference to FIG. 2, a method for fabricating an electrode component in accordance with the present invention is shown. Given the electrode component as a varistor, the method includes steps of spray granulation, dry press molding, ceramic sintering and ceramic pre-treatment, which are known as conventional techniques and are not repeated here. After the ceramic substrate 1 is pre-treated, a process of spray-forming the electrode layers 3 and subsequent steps for pin soldering, insulation packaging, hardening and the like are described in details as follows.

Figure 3:
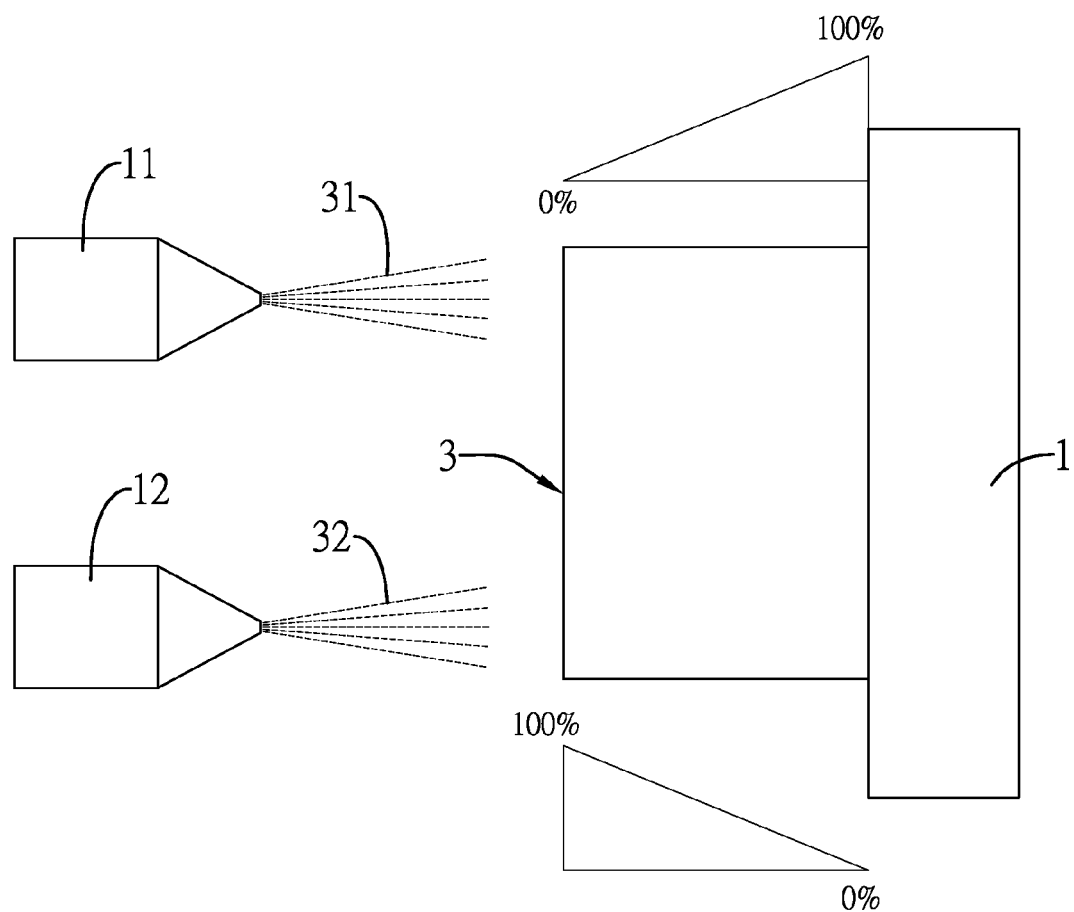
FIG. 3 is a schematic view showing electrode concentration variation gradients in spraying an electrode layer of the electrode component in FIG. 1A.

With reference to FIG. 3, the electrode layer 3 of the electrode component pertains to a spray coating formed by spraying two kinds of metal materials on the ceramic substrate 1. Two concentration variation gradients of the two kinds of metal materials progressively decrease in two respective opposite directions. Fabrication of the electronic component can be performed as follows.

A ceramic substrate 1 with two opposite surfaces is placed on a work platform of a continuous-type electric arc furnace or flame spray equipment. The spray equipment pertaining to a continuous tunnel type can directly spray the two opposite surfaces of the ceramic substrate 1, and has multiple spray nozzles for multiple stations. Each spray nozzle serves to spray one type of material or an alloy of the material and two spray nozzles are grouped as one set of spray nozzles.

Figure 4A:
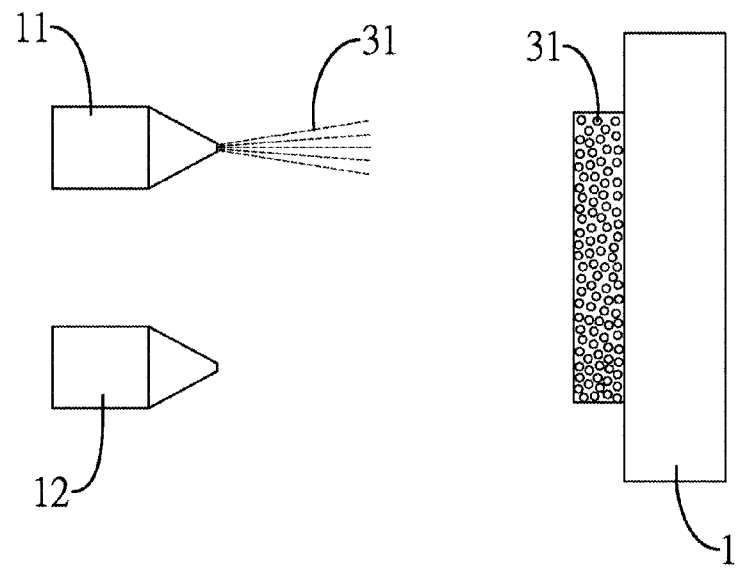
FIGS. 4A to 4C are associated with schematic views showing steps of using two spray guns to spray the electrode layer in FIG. 3.
Figure 4B:
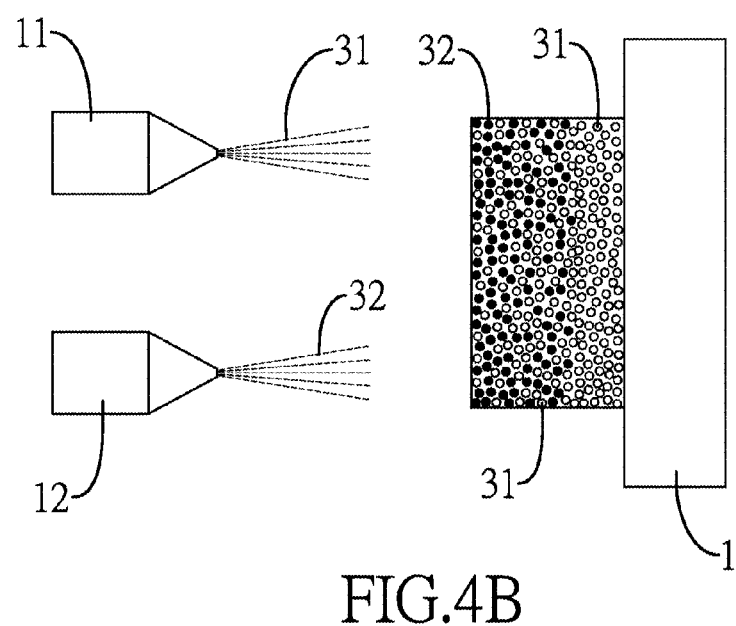

With reference to FIG. 4A, when the spraying is started, a first spray nozzle 11 sprays a first metal material 31 that has high bonding strength with the ceramic substrate 1, such as nickel, or aluminum, or an alloy of nickel or aluminum during an initial stage of spray forming of one of the electrode layers 3. The concentration of the first metal material 31 progressively decreases with time from 100% down to 0% during the initial stage. A portion full of circles only in the electrode layer 3 indicates the portion formed of the first metal material 31 at the initial stage of the spray forming With reference to FIG. 4B, after the first spray nozzle 11 sprays about 0.5~1 second, an intermediate stage of the spray forming starts and a second spray nozzle 12 joins the first spray nozzle 11 to spray a second metal material with better solderability, such as tin, aluminum, zinc, or copper or an alloy of tin, aluminum, zinc or copper, such that the first metal material 31 and the second metal material 32 are mixed to form a portion of the electrode layer 3 during the intermediate stage. The concentration of the second metal material 32 progressively increases with time from 0% up to 100%. The portion of the electrode layer 3 formed during the intermediate stage constitutes a distinct interface region containing the mixed first metal material 31 and second metal material 32, which differs from the interface region appearing in conventional spraying forming technique of the electrode layer.

Figure 4C:
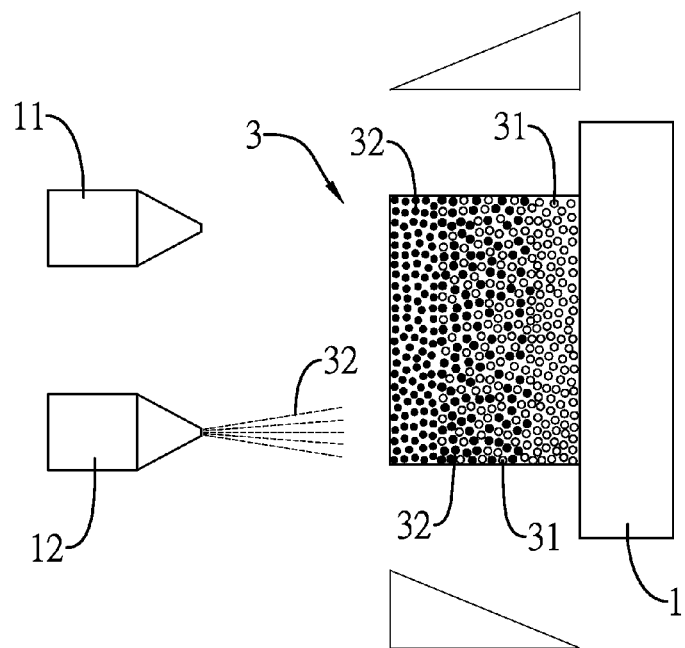

With reference to FIG. 4C, when a final stage of the spray forming is started, the operation of the first spray nozzle 11 is stopped while the second spray nozzle 12 remains in operation, such that the second metal material 32 with better solderability, such as tin, zinc or copper, is continuously sprayed in the final stage of forming the electrode layer 3 to facilitate subsequent soldering process. After the final stage of the spray forming is completed, a total spray thickness of the electrode layer 3 is approximately 20~100 μm.

During the course of the foregoing fabrication processes, the work platform sequentially passes through several spray chambers in a tunnel. Depending on parameters configured for the first spray nozzle 31 and the second spray nozzle 32, a wire feed voltage of each of the first spray nozzle 11 and the second spray nozzle 12 is controlled within a range of 0~20V by a program to adjust spraying amount and time in formation of two concentration variation gradient distributions of the first metal material 31 and the second metal material 32 during the spray forming of the electrode layer 3. Those parameters configured include a spray voltage 20~35V, a spray current 100~200 Å, a spray pressure 0.5 Mpa, and a total spraying time 4~10 seconds.

After the spray forming of the electrode layer 3 is done, the two pins 2 are soldered with a Sn—Cu solder alloy. An insulating resin layer taken as the insulating layer 4 shown in FIGS. 1A and 1B is used to enclose the ceramic substrate 1, the electrode layers 3 and a hidden portion of each pin 2, and is further hardened by a high temperature. The electrical properties of the ceramic substrate 1, the electrode layer 3 and the pins 2 packaged by the insulating layer 4 are tested.

Figure 5:
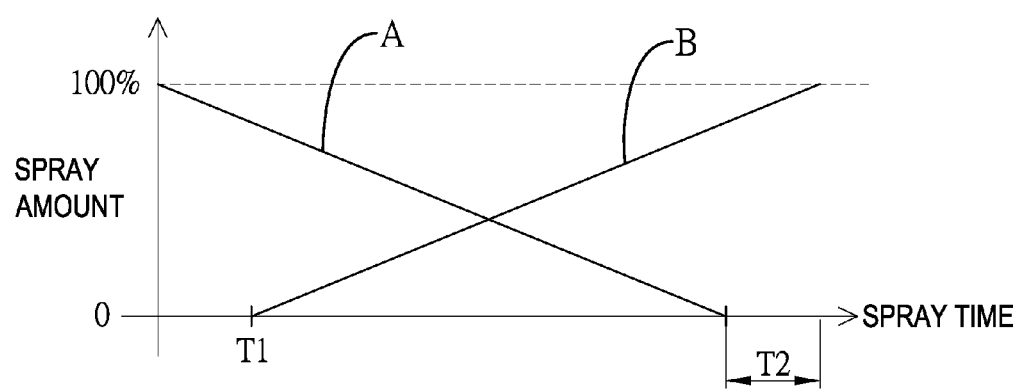
FIG. 5 is a curve showing spray rates of spraying two metal materials in accordance with the present invention.

The so-called "concentration" of the first metal material 31 and the second metal material 32 means the spray amount in unit time, for example, the concentration 100% represents the highest amount of metal material sprayed from the spray nozzle. The progressive decrease in concentration means that the amount of spray in unit time of the spray nozzle is gradually reduced, for example, the concentration 0% represents that the spray nozzle fully stops spraying. With reference to FIG. 5, a line "A" stands for a curve associated with the spray amount of the first metal material 31 from the first spray nozzle 11 progressively decreasing with time. When a period of time T1 expires after the first spray nozzle 11 starts spraying, the second spray nozzle 12 joins the first spray nozzle 11 to start spraying. A line "B" stands for a curve associated with the spray amount of the second metal material 32 from the second spray nozzle 12 progressively increasing with time. The second spray nozzle 12 stops spraying when a period of time T2 expires after the first spray nozzle 11 stops spraying.

Furthermore, two right triangles illustrated above and under the electrode layer 3 in each of FIGS. 3 and 4C respectively represent the two concentration variation gradients associated with the first metal material 31 and the second metal material 32 in the electrode layer 3. The hypotenuse of the upper right triangle going downhill in an outward direction away from one of the two opposite surfaces of the ceramic substrate 1 represents that the spray amount of the first metal material 31 progressively decreases. On the other hand, the hypotenuse of the lower right triangle going uphill in an outward direction away from the surface of the ceramic substrate 1 represents that the spray amount of the second metal material 32 progressively increases.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An electrode component, comprising:
   a ceramic substrate having two opposite surfaces;
   two electrode layers respectively formed on the two opposite surfaces of the ceramic substrate;
   two pins, each pin having a top portion connected to a respective one of the two electrode layers; and
   an insulating layer enclosing the ceramic substrate, the two electrode layers and the top portion of each pin;
   wherein each electrode layer is formed of two or more base metal materials or alloys of the base metal materials with a concentration gradient of each of the base metal materials progressively varying across the electrode layer.

2. The electrode component as claimed in claim 1, wherein each electrode layer is formed by two or more of zinc, copper, tin, nickel and aluminum or alloys of two or more of zinc, copper, tin, nickel and aluminum, and has a thickness in a range of 20 to 100 µm.

3. The electrode component as claimed in claim 1, wherein each electrode layer is formed on a corresponding surface of the ceramic substrate sequentially through an initial stage, an intermediate stage and a final stage, and a portion of the electrode layer formed during the initial stage is formed of a first metal material or an alloy of the first metal material, a portion of the electrode layer formed during the final stage is formed of a second metal material or an alloy of the second metal material, and a portion of the electrode layer formed during the intermediate stage is formed of the first metal material and the second metal material or an alloy of the first metal material and the second metal material.

4. The electrode component as claimed in claim 2, wherein each electrode layer is formed on a corresponding surface of the ceramic substrate sequentially through an initial stage, an intermediate stage and a final stage, and a portion of the electrode layer formed during the initial stage is formed of a first metal material or an alloy of the first metal material, a portion of the electrode layer formed during the final stage is formed of a second metal material or an alloy of the second metal material, and a portion of the electrode layer formed during the intermediate stage is formed of the first metal material and the second metal material or an alloy of the first metal material and the second metal material.

5. The electrode component as claimed in claim 3, wherein the portions of the electrode layer formed from the initial stage to the intermediate stage have a concentration of the first metal material progressively decreasing in an outward direction away from the corresponding surface of the ceramic substrate, and the portions of the electrode layer formed since the intermediate stage have a concentration of the second metal material progressively increasing in the outward direction away from the corresponding surface of the ceramic substrate.

6. The electrode component as claimed in claim 4, wherein the portions of the electrode layer formed from the initial stage to the intermediate stage have a concentration of the first metal material progressively decreasing in an outward direction away from the corresponding surface of the ceramic substrate, and the portions of the electrode layer formed since the intermediate stage have a concentration of the second metal material progressively increasing in the outward direction away from the corresponding surface of the ceramic substrate.

7. The electrode component as claimed in claim 3, wherein the portions of the electrode layer formed from the initial stage to the intermediate stage are formed of nickel, or aluminum, or an alloy of nickel or aluminum, and the portions of the electrode layer formed since the intermediate stage are formed of zinc, copper, or tin, or an alloy of zinc, copper, or tin.

8. The electrode component as claimed in claim 4, wherein the portions of the electrode layer formed from the initial stage to the intermediate stage are formed of nickel, or aluminum, or an alloy of nickel or aluminum, and the portions of the electrode layer formed since the intermediate stage are formed of zinc, copper, or tin, or an alloy of zinc, copper, or tin.

9. The electrode component as claimed in claim 5, wherein the portions of the electrode layer formed from the initial stage to the intermediate stage are formed of nickel, or aluminum, or an alloy of nickel or aluminum, and the portions of the electrode layer formed since the intermediate stage are formed of zinc, copper, or tin, or an alloy of zinc, copper, or tin.

10. The electrode component as claimed in claim 6, wherein the portions of the electrode layer formed from the initial stage to the intermediate stage are formed of nickel, or aluminum, or an alloy of nickel or aluminum, and the portions of the electrode layer formed since the intermediate stage are formed of zinc, copper, or tin, or an alloy of zinc, copper, or tin.

11. A method for fabricating an electrode component, wherein the electronic component has:
   a ceramic substrate having two opposite surfaces;
   two electrode layers respectively formed on the two opposite surfaces of the ceramic substrate;
   two pins, each pin having a top portion connected to a respective one of the two electrode layers; and
   an insulating layer enclosing the ceramic substrate, the two electrode layers and the top portion of each pin;
   wherein each electrode layer is formed of two or more base metal materials or alloys of the base metal materials with a concentration gradient of each of the base metal materials progressively varying across the electrode layer;
   the method comprises steps of:
   preparing the ceramic substrate pre-treated and having the two opposite surfaces;
   forming each electrode layer on one of the two opposite surfaces of the ceramic substrate by a spray forming process, wherein the spray forming process has steps of:
      spraying a first metal material to a corresponding surface of the ceramic substrate, and spraying a second metal material to the corresponding surface of the ceramic substrate when a first period of time expires after the first metal material begins to be sprayed; and
      stopping spraying the first metal material and stopping spraying the second metal material when a second period of time expires after stopping spraying the first metal material to form the electrode layer on the corresponding surface of the ceramic substrate;
   connecting the two pins respectively to the electrode layers on the two opposite surfaces of the ceramic substrate; and
   enclosing the ceramic substrate, the electrode layers and a portion of each pin with an insulating layer.

12. The method as claimed in claim 11, wherein a concentration of the sprayed first metal material progressively decreases in an outward direction away from the corresponding surface of the ceramic substrate, a concentration of the sprayed second metal material progressively increases in the outward direction away from the corresponding surface of the ceramic substrate, and a portion of each electrode layer where both the first metal material and the second metal material are mixed and present constitutes an interface region.

13. The method as claimed in claim 11, wherein the first metal material is selected from one of nickel, aluminum, and an alloy of nickel or aluminum, the second metal material is selected from zinc, copper, or tin or an alloy of zinc, copper or tin, and a thickness of each electrode layer is in a range of 20 to 100 μm.

14. The method as claimed in claim 12, wherein the first metal material is selected from one of nickel, aluminum, and an alloy of nickel or aluminum, the second metal material is selected from zinc, copper, or tin or an alloy of zinc, copper or tin, and a thickness of each electrode layer is in a range of 20 to 100 μm.

15. The method as claimed in claim 11, wherein the first metal material and the second metal are respectively sprayed out from a first spray nozzle and a second spray nozzle, and a spray voltage, a spray current, a spray pressure and a total spray time for the first spray nozzle and the second spray nozzle are respectively 20 to 30V, 100 to 200 A, 0.5 Mpa, and 4 to 10 seconds.

16. The method as claimed in claim 12, wherein the first metal material and the second metal are respectively sprayed out from a first spray nozzle and a second spray nozzle, and a spray voltage, a spray current, a spray pressure and a total spray time for the first spray nozzle and the second spray nozzle are respectively 20 to 30V, 100 to 200 A, 0.5 Mpa, and 4 to 10 seconds.

17. The method as claimed in claim 11, wherein the first period of time is in a range of 0.5 to 1 second.

18. The method as claimed in claim 12, wherein the first period of time is in a range of 0.5 to 1 second.

* * * * *